United States Patent [19]

Gleason et al.

[11] Patent Number: 4,600,515

[45] Date of Patent: Jul. 15, 1986

[54] FLUID LOSS CONTROL AGENTS FOR DRILLING FLUIDS CONTAINING DIVALENT CATIONS

[75] Inventors: Patricia A. Gleason, Westfield; Chester D. Szymanski, Martinsville, both of N.J.

[73] Assignee: National Starch and Chemical Corporation, Bridgewater, N.J.

[21] Appl. No.: 650,316

[22] Filed: Sep. 12, 1984

[51] Int. Cl.$^4$ .............................................. C09K 7/02
[52] U.S. Cl. ............................. 252/8.5 A; 252/8.5 C
[58] Field of Search .................... 252/8.5 A, 8.5 C

[56] References Cited

U.S. PATENT DOCUMENTS

| | | | |
|---|---|---|---|
| 2,718,497 | 9/1955 | Oldham et al. | 252/8.5 |
| 2,775,557 | 12/1956 | Morgan et al. | 252/8.5 |
| 3,072,569 | 1/1963 | Siegele | 252/8.5 |
| 3,323,603 | 6/1967 | Lummus et al. | 175/65 |
| 3,734,873 | 5/1973 | Anderson et al. | 252/8.5 X |
| 3,953,335 | 4/1976 | Jackson | 252/8.5 |
| 3,986,964 | 10/1976 | Smithey | 252/8.5 |
| 4,301,016 | 11/1981 | Carriere et al. | 252/8.5 |
| 4,309,329 | 1/1982 | Lucas et al. | 252/8.5 |
| 4,455,240 | 6/1984 | Costello | 252/8.5 |

FOREIGN PATENT DOCUMENTS

| | | |
|---|---|---|
| 1514057 | 6/1978 | United Kingdom . |
| 2077750 | 4/1985 | United Kingdom . |

*Primary Examiner*—Herbert B. Guynn
*Attorney, Agent, or Firm*—Lori D. Tolly; Edwin M. Szala

[57] ABSTRACT

Low and high solids drilling fluids containing high levels (i.e., at least 10,000 ppm) of divalent cations are provided with improved fluid loss control by employing high molecular weight water-in-oil emulsion copolymers of acrylamide and a water soluble salt of acrylic acid. The copolymers, produced by the copolymerization in water-in-oil emulsions form of acrylamide and acrylic acid or the salt thereof in molar ratios of 70:30 to 95:5 are particularly effective in drilling fluids containing high levels of calcium ions.

20 Claims, No Drawings

FLUID LOSS CONTROL AGENTS FOR DRILLING FLUIDS CONTAINING DIVALENT CATIONS

BACKGROUND OF THE INVENTION

The present invention relates to the use of emulsion copolymers as fluid loss control agents in low solids drilling fluids and in dense drilling muds. The copolymers provide excellent fluid loss control to water-based drilling fluids and muds which contain large amounts of divalent cations such as calcium and magnesium.

In drilling subterranean wells and especially when employing rotary methods, drilling fluids or muds perform a variety of functions which influence such factors as the drilling rate, cost, efficiency and safety of the operation. Drilling fluids are circulated down through the drill shaft, out the bottom of the drill bit and up the annular space between the drill pipe and the formation wall to the surface where they may be mechanically or chemically treated and recirculated. The fluids provide lubrication at the point where the drill bit cuts into a geologic formation as well as along the length of the rotary drill pipe. As it lubricates the system, the fluid removes heat which is produced by the cutting action of the bit while additionally performing the important task of transporting cuttings produced by the system to the surface for removal. An acceptable drilling fluid must have body yet be free flowing with a measurable relatively low viscosity in order to be easily pumped. In addition, the fluid must have an acceptable gel strength in order to suspend the solid material if circulation is interrupted and to prevent accumulation of solids at the bit thus preventing mechanical jamming.

Drilling fluids must also provide sufficient equalizing pressure to contain naturally occurring liquid or gaseous components encountered in the formations pierced by the drill. By using proper mud formulations, possible collapses or blowouts resulting from uncontrolled influxes of formation fluids may be prevented.

Excessive loss of liquid to the formation results in increased fluid viscosities which causes decreases in drilling times in addition to poorer cuttings removal and lubrication. Therefore, in addition to preventing the flow of formation fluids into the hole, drilling fluids should also minimize the flow of liquid out into the formation. Both functions are served by the ability of the fluid to form a compressible, thin (but substantially impermeable) filter cake against exposed permeable formations composed of native solids found in the well bore and the solids present in the drilling fluid. In addition to being thin, a filter cake is also preferably smooth and firm yet flexible. Conversely, inferior filter cakes are thick, lumpy and/or brittle. If such deficient filter cakes are formed, additional problems such as abnormal pipe drag, differential pressure sticking, pressure surges, and swabbing will result.

The most common fluid loss control agents are clay solids present in the aqueous muds. By providing a wide particle size distribution of colloidal solids, a dense filter cake having both low porosity and low permeability is obtained as smaller size particles plug openings existing between the larger size partices. Bentonite clay, which contains a larger percentage of fine particles compared to other clays, is often employed as the primary filtration control agent.

When the use of clays alone does not lower the fluid loss of a drilling fluid to a sufficient level to eliminate damage to the formation as well as to the drilling equipment, organic colloids are often employed. The colloids hydrate in the aqueous fluid and proceed to bridge the gaps and pores between the clay particles resulting in a more impermeable filter cake. Typical organic colloids include, for example, pregelatinized starch, carboxymethyl cellulose and polyanionic cellulose. These materials are not without their disadvantages. For example, although possessing some salt tolerance, starches are known to be subject to bacterial attack and thermal degradation above 250° F. Carboxymethyl cellulose is also subject to thermal degradation, and while known to be effective in calcium and sodium systems, it becomes less effective as salt concentrations exceed about 50,000 ppm. Polyanionic cellulose is used in salt systems due to its relatively high level of salt tolerance; however, this colloid often produces undesirable thickening or gelling of the drilling fluids which overshadows its salt tolerance.

Many water soluble homo- and copolymers based on vinyl monomers have also been found to be useful as fluid loss control additives:

In U.S. Pat. No. 2,650,905 (issued Sept. 1, 1953 to R. Fordyce et al.), use of sulfonated polystyrene polymers was shown to aid in forming substantially impermeable films around the walls of the bore hole while at the same time not affecting the viscosity of the muds.

In U.S. Pat. No. 4,455,240 (issued June 19, 1984 to C. A. Costello) drilling fluids treated with carboxylic functional polyampholytic co- or terpolymers containing anionic, cationic and optionally nonionic mer units had decreased fluid losses.

U.S. Pat. No. 2,718,497 (issued Sept. 20, 1955 to W. Oldham et al.) describes dry or solution copolymers containing carboxylic acid salt groups in a ratio of one carboxylic acid salt group to each two to six linear chain carbon atoms to provide fluid loss control to aqueous drilling muds. Applicable polymers included those obtained by polymerizing unsaturated aliphatic monocarboxylic acids such as acrylic or methacrylic acid. Hydrolyzed and saponified polymers and copolymers of acrylamide, acrylonitrile and the alkyl esters of acrylic acid were also described as useful. The additives were said to sequester only a limited quantity of calcium and other alkaline earth metal ions.

U.S. Pat. No. 2,775,557 (issued Dec. 25, 1956 to R. Morgan) describes the use of water-soluble salts of acrylamide-acrylic acid copolymers as wall sealing agents with improved water-retaining properties in a drilling mud while not increasing the viscosity of the mud. Copolymers having acrylamide:acrylate molar ratios of 60:40 to 75:25 were shown to provide fluid loss control in salt contaminated muds containing saturated sodium chloride or slightly soluble calcium sulfate or calcium hydroxide, for example.

Though not directed to fluid loss control, U.S. Pat. No. 3,323,603 (issued June 6, 1967 to J. Lummus et al.) also describes the use of acrylate-acrylamide copolymers in low solids drilling fluids. Small amounts (i.e., 0.005–0.15 pounds per 42-gallon barrel (ppb)) of the highly hydrolyzed polymers added to systems containing low concentrations of bentonite and less than 500 ppm $Ca^{++}$ ion were found to beneficiate the bentonite while flocculating other clays present in the system.

In U.S. Pat. No. 3,072,569 (issued Jan. 8, 1963 to F. Siegele) fluid loss control agents which are useful in clay based drilling muds having calcium ion contents of at least 500 ppm at elevated temperatures are described.

The agents are comprised of a substantially homogenous linear hydrocarbon chain containing both hydroxyl and carboxylic acid groups such as, for example, copolymers of vinyl acetate and either a carboxylic acid monomer or derivative, which upon hydrolysis yield hydroxyl and carboxylic acid salt groups, respectively.

Vinyl sulfonate-vinylamide polymers have also been used as fluid loss control agents. These polymers, containing anionic sulfo groups, have been described to be insensitive to calcium ions and as such have found usefulness in drilling through electrolyte-releasing formations.

Contamination by divalent cations, such as calcium and magnesium, occurs when drilling through electrolyte-releasing formations which contain gypsum, lime, and other salt deposits. If only small quantities of calcium ion are encountered, drilling muds are often treated with a carbonate such as soda ash to precipitate the ions in order to increase the efficiency of the fluid loss control agents employed. This is a costly time-consuming step which is not effective when larger quantities of more water-soluble calcium and magnesium salts (i.e. $CaCl_2$ and $MgCl_2$) are encountered, especially in the formation brines of such notable basins as Williston Basin, North Dakota and Anadarko Basin, Oklahoma. Oftentimes, fresh or sea water muds are actually calcium treated with quantities of gypsum or lime in order to alleviate problems that are associated with drilling in water-sensitive shale or clay-bearing formations.

There is therefore a need for fluid loss control agents which are compatible in salt-contaminated drilling fluids. If an additive is incompatible in a contaminated system, dramatic increases in fluid viscosity or clay flocculation may result. If gel formation results, the formation wall may easily become plugged thereby preventing oil from later flowing freely into the producing zone.

For the above reasons, those in the drilling field continue to search for agents that provide improved fluid loss control to drilling fluids and muds which contain high concentrations of divalent cations.

It is an objective of the present invention to provide drilling fluid additives which provide improved fluid loss control in drilling fluids containing large quantities of calcium as well as other divalent ions.

SUMMARY OF THE INVENTION

The present invention provides fluid loss control agents for use in drilling subterranean wells which have improved divalent cation tolerance comprising water-in-oil emulsion copolymers of acrylamide and a water-soluble salt of acrylic acid. By employing the agents in amounts of about 0.5 to 8.0 ppb., based on dry solids, drilling fluids containing divalent metal cations such as calcium and magnesium in amounts of at least 10,000 ppm are provided with improved fluid loss control. The emulsion copolymers herein, having molecular weights of at least 1 million, are prepared by copolymerizing acrylamide and acrylic acid or a salt thereof in molar ratios of about 70:30 to 95:5, preferably 80:20 to 90:10.

DESCRIPTION OF THE PREFERRED EMBODIMENTS

The fluid loss control additives employed in the present invention are water-in-oil emulsion copolymers of acrylamide and a water soluble salt of acrylic acid. The copolymers may be prepared by the copolymerization of acrylamide and acrylic acid with subsequent neutralization, or preferably the acrylic acid is in water soluble salt form prior to polymerization. The acrylamide:acrylate copolymers useful herein will possess an acrylamide to acrylate molar ratio of about 70:30 to 95:5, preferably 80:20 to 90:10.

Alkali metal (i.e., sodium and potassium) or ammonium hydroxides may be employed to neutralize the acrylic acid to the water soluble salt form. The alkali metal hydroxides are preferably employed due to the undesirable evolution of ammonia from ammonium acrylate copolymers caused by the conditions of most drilling operations.

The copolymerization of the monomers may be achieved according to any number of conventional water-in-oil emulsion polymerization techniques known to those skilled in the art which will provide high molecular weight copolymers. Suitable processes include those taught in U.S. Pat. Nos. 3,284,393 (issued Nov. 8, 1966 to J. Vanderhoff et al.); Re. 28,474 (reissued July 8, 1974 to D. Anderson et al.); 3,826,771 (issued July 30, 1974 to D. Anderson et al.); 4,070,321 (issued Jan. 24, 1978 to L. Goretta et al.); and 4,077,930 (issued Mar. 7, 1978 to S. Lim et al.) the disclosures of which are herein incorporated by reference. The teachings of these patents comprise forming water-in-oil emulsions of water-soluble ethylenic unsaturated monomers. The emulsions are formed by utilizing a water-in-oil emulsifying agent. A free radical-type polymerization catalyst is added to the emulsion and then heat is applied in order to form water-soluble polymer latices under radical-forming conditions. The polymers will generally be present in the emulsion in amounts of about 25–50% solids by weight.

While not contributing to fluid loss control performance, inverting surfactants having a high hydrophilic/lipophilic balance (as taught in the literature, e.g., by the HLB Surfactant System of ICI Americas Inc.) are preferably added to the emulsion after polymerization in order to increase the ease with which the emulsions will invert in water and thus disperse in an aqueous drilling fluid. By employing these surfactants, the amount of time and shear required to disperse the copolymers is significantly less than that required for other typical fluid loss control additives. The surfactants have also been seen to provide increased polymer stability over time by dispersing the latex particles.

The acrylamide:acrylate emulsion copolymers, having molecular weights in excess of one million, have surprisingly been found to be useful in aqueous low and high solids drilling fluids which contain significantly higher concentrations of divalent cations compared to the low concentrations disclosed in the references related to acrylic acid polymers and copolymers described above. High calcium ion-containing fluids prepared from 4% to 49.4% (saturated) calcium chloride aqueous solutions ($\approx$10,900–134,800 ppm $Ca^{++}$ ions) have been tested with significant fluid loss results obtained. Drilling fluids containing saturated magnesium chloride ($\approx$74,800 ppm $Mg^{++}$ ions) as well as brine solutions having large quantities of both calcium and magnesium ions have also been evaluated with similar success.

In order for the copolymers herein to provide substantially impermeable filter cakes for effective fluid loss control, the drilling fluid must contain at least a minor amount of a bridging solid. While bentonite or calcium carbonate in concentrations of as little as 0.25 ppb. have provided adequate bridging, other typical particles such as sized sodium chloride may be employed with similar results expected.

The quantity of acrylamide:acrylate emulsion copolymer necessary to provide effective fluid loss control will vary with circumstances depending on such factors as the weight and character of drilling fluid treated and the formation strata type encountered in addition to the cation concentration of the fluid. Ordinarily, good fluid loss control will be realized when the copolymer is added in amounts of about 0.5 to about 8 ppb., preferably 1-4 ppb. It was noted that as the treatment level of the copolymer is increased, the thickness of the filter cake produced generally decreases as does the amount of fluid loss. The molar ratio of the copolymer employed may also determine the treatment level required. Generally higher treatment levels of 70:30 acrylamide: acrylate copolymer are necessary in comparison to copolymers which contain higher acrylamide to acrylate molar ratios in order to obtain similar fluid loss results. In the presence of the highest levels of divalent ion contamination (i.e., saturated calcium chloride) copolymers containing less than about 25 molar percent of the acrylate constituent are preferably employed.

Due to difficulties encountered when attempting to accurately measure molecular weights in excess of 1 million, as commonly expected from emulsion polymerization techniques, relative viscosities of the emulsion copolymers were determined. The relative viscosities of the polymers were measured by the following procedure employing a Dudley viscosity pipette which is calibrated to deliver 100 cc of deionized water at 100° F. in 34 seconds. A 0.1% polymer solution was prepared by adding 0.2 g (based on dry solids) of the acrylamide:acrylate emulsion to a half pint glass jar containing 200 g distilled water equipped with a Bodine motor agitating at 400 rpm. The solution was mixed for 15 minutes than allowed to stand for an additional 30 minutes. The relative viscosity of a sample was the time it took for a 100 cc portion of the 0.1% solution to flow through the pipette at room temperature.

The relative viscosity of an emulsion copolymer useful herein will be at least about 37 seconds. Although emulsion copolymers having higher viscosities are expected to also provide acceptable fluid loss control in divalent cation-containing fluids, those having relative viscosities of 40-60 seconds are preferably employed.

The following examples are presented to particularly illustrate the invention but they are not intended to limit it in any manner except as it is limited in the appended claims.

Unless otherwise noted, the standard drilling fluid employed in the examples consisted of 350 ml water and 22.5 grams bentonite. The salt-containing fluids were prepared by first dissolving the designated amount of salt into the water and dispersing the fluid loss control agent to be tested prior to adding the bentonite. The treated fluids were stirred for 20 minutes employing a Hamilton Beach Multimixer then sealed in glass jars prior to being statically aged at room temperature or 180° F. After aging the samples were evaluated for fluid loss control by a standard procedure described in API Recommended Practice, 13B, May 1982, Section 3. In addition to recording the fluid loss of a sample, the thickness as well as the physical characteristics of the filter cake were noted for comparative purposes only. Generally, a filter cake having a thickness after API filtration up to about 5/32 in. was regarded as acceptable, with thinner filter cakes being preferred. In 350 ml of fluid, 1 gram of fluid loss control agent corresponded to a 1 ppb. treatment level.

In all cases, the quantities of the additives employed were based on dry basis. Emulsion as used herein refers to a water-in-oil emulsion and calcium chloride refers to the dihydrate form (i.e., $CaCl_2 \cdot 2H_2O$).

EXAMPLE 1

This example illustrates the ability of an acrylamide:potassium acrylate emulsion copolymer to effectively provide fluid loss control to calcium-containing drilling fluids in comparison to a sodium polyacrylate emulsion polymer.

Drilling fluids prepared with 4% and saturated aqueous solutions of $CaCl_2$ and 4% NaCl were treated with 1 to 3 ppb of the polymers and aged for 16 hours at 180° F. Fluid loss results may be found in Table I.

TABLE I

| Polymer* | Treatment Level (ppb.) | A.P.I. Fluid Loss (cc in 30 minutes) | | |
|---|---|---|---|---|
| | | 4% NaCl | 4% $CaCl_2$ | Saturated $CaCl_2$ |
| Blank-Control | — | 74 | 115 | 112 |
| 80:20 acrylamide: | 1 | 16 | 146 | 7 |
| potassium acrylate | 2 | 8 | 28 | 3 |
| | 3 | 7 | 8 | 2 |
| sodium polyacrylate | 1 | 51 | 136 | 190 |
| | 2 | 29 | 138 | 192 |
| | 3 | 9 | 132 | 176 |

*Both polymers had relative viscosities of 50 seconds.

The results show that the polymers were both effective in a sodium system, however, only the acrylamide:acrylate emulsion copolymer was effective in both 4% and saturated calcium chloride-containing fluids.

EXAMPLE 2

This example illustrates the ability of acrylamide:acrylate emulsion copolymers to effectively provide fluid loss control to drilling fluids which contain either 4% NaCl or $CaCl_2$ in comparison to polyanionic cellulose. The fluids were treated with 1 to 3 ppb of the polymers then aged for 16 hours at room temperature. See Table II for the results.

TABLE II

| Polymer | Salt Concentration | Polymer Treatment Level (ppb.) | A.P.I. Fluid Loss Results After Room Temp. Aging | |
|---|---|---|---|---|
| | | | cc. After 30 min. | Cake Thickness 1/32 in. |
| 70:30 acrylamide: | 4% NaCl | 1 | 10 | 1 |
| sodium acrylate[a] | | 3 | 9 | 1 |
| | 4% $CaCl_2$ | 1 | 64 | 4 |
| | | 3 | 10 | <1 |
| 70:30 acrylamide: | 4% NaCl | 1 | <5 | <1 |
| potassium acrylate[a] | | 3 | 37 | 2 |
| | 4% $CaCl_2$ | 1 | 210 | 6 |

TABLE II-continued

| Polymer | Salt Concentration | Polymer Treatment Level (ppb.) | A.P.I. Fluid Loss Results After Room Temp. Aging | |
|---|---|---|---|---|
| | | | cc. After 30 min. | Cake Thickness 1/32 in. |
| polyanionic cellulose | 4% NaCl | 3 | 10 | 2 |
| | | 1 | 8 | 1 |
| | | 3 | 7 | 1 |
| | 4% CaCl$_2$ | 1 | 162 | 10 |
| | | 3 | 45 | 9 |

[a] Copolymers were prepared similarly to copolymer of Example I with relative viscosities of about 50 seconds expected.

The results show that while all the polymers provided good fluid loss control in the sodium system, the emulsion copolymers were superior to the polyanionic cellulose in a system which contained a high level of calcium ions.

EXAMPLE 3

This example illustrates the molar ratios of acrylamide to acrylate necessary in the emulsion copolymer to provide efficient fluid loss control in calcium-containing systems.

Acrylamide was emulsion copolymerized with potassium acrylate in molar concentrations of 90:10 to 50:50 with similar relative viscosities of approximately 49 seconds expected. An emulsion polyacrylamide homopolymer having a relative viscosity of 40 seconds was also prepared. The homopolymer and copolymers were added to drilling fluids prepared from 4% and saturated aqueous solutions of CaCl$_2$ in treatment levels of 1-3 ppb. The fluids were evaluated after 16 hours at room temperature and 180° F. aging. The results may be found in Tables III and IV.

The results show that the copolymer containing equimolar amounts of acrylamide and acrylate was ineffective in both calcium systems. The copolymers comprising at least 70 molar percent acrylamide dispersed readily in the drilling fluids, producing no lumps or significant changes in viscosity, while providing good fluid loss control. It was noted that for each useful copolymer, higher treatment levels were required in the 4% CaCl$_2$ systems than in the saturated systems in order to provide similar fluid loss control. The 100% acrylamide emulsion polymer provided fluid loss control in the saturated system; however, the drilling fluid became undesirably thick and dilatant which can cause the filter paper to plug during evaluation.

TABLE III

| Acrylamide:Potassium Acrylate Molar Ratio | Treatment Level (ppb) | A.P.I. Fluid Loss Results After 180° F. Aging (cc. after 30 minutes) | |
|---|---|---|---|
| | | 4% CaCl$_2$ | Saturated CaCl$_2$ |
| Blank | — | 115 | 112 |
| 50:50 | 1 | 111 | 316 |
| | 2 | 125 | 312 |
| | 3 | 144 | 310 |
| 70:30 | 1 | 206 | 319 |
| | 2 | 63 | 59 |
| | 3 | 11 | 19 |
| 80:20[a] | 1 | 295 | 4 |
| | 2 | 56 | 3 |
| | 3 | 25 | 2 |
| 85:15 | 1 | 294 | 5 |
| | 2 | 120 | 2 |
| | 3 | 20 | 2 |
| 90:10 | 1 | 293 | 5 |
| | 2 | 60 | 3 |
| | 3 | 16 | 2 |

[a] Copolymer had a relative viscosity of 49 seconds.

TABLE IV

| Acrylamide:Potassium Acrylate Molar Ratio | Treatment Level (ppb) | A.P.I. Fluid Loss of Saturated CaCl$_2$ Fluid After Room Temp. Aging (cc. after 30 minutes) |
|---|---|---|
| Blank | — | 104 |
| 50:50 | 1 | 246 |
| | 2 | 204 |
| | 3 | 160 |
| 70:30 | 1 | 296 |
| | 2 | 33 |
| | 3 | 4 |
| 80:20 | 1 | 8 |
| | 2 | 3 |
| | 3 | 2 |
| 90:10 | 1 | 5 |
| | 2 | 3 |
| | 3 | 3 |
| 100:0 | 1 | 278[a] |
| | 2 | 26[a] |
| | 3 | 2[a] |

[a] The fluids were very thick and dilatant.

EXAMPLE 4

This example further illustrates the ability of two acrylamide: potassium acrylate emulsion copolymers to effectively control fluid loss in drilling fluids which contain increasing amounts of calcium chloride. A 2 ppb treatment level of an 80:20 molar ratio acrylamide:potassium acrylate emulsion copolymer (having a relative viscosity of 50 sec.) and a similary prepared 70:30 molar ratio copolymer (with a similar relative viscosity expected) were added to a series of drilling fluids prepared from 6% to saturated aqueous solutions of calcium chloride. The samples were aged at 180° F. for 24 hours. Results may be found in Table V.

TABLE V

| Acrylamide:Potassium Acrylate Molar Ratio | CaCl$_2$ Concentration | Ca++ ppm | API Fluid Loss Results After 180° F. Aging (cc. after 30 minutes) |
|---|---|---|---|
| 70:30 | 6% | 16,362 | 26 |
| 80:20 | | | 18 |
| 70:30 | 10% | 27,270 | 15 |

TABLE V-continued

| Acrylamide:Potassium Acrylate Molar Ratio | CaCl$_2$ Concentration | Ca++ ppm | API Fluid Loss Results After 180° F. Aging (cc. after 30 minutes) |
|---|---|---|---|
| 80:20 | | | 21 |
| 70:30 | 20% | 54,540 | 14 |
| 80:20 | | | 14 |
| 70:30 | 30% | 81,810 | 10 |
| 80:20 | | | 10 |
| 70:30 | 40% | 109,080 | 11 |
| 80:20 | | | 10 |
| 70:30 | 45% | 122,715 | 5 |
| 80:20 | | | 6 |
| 70:30 | 49.4% (sat'd.) | 134,714 | 168 |
| 80:20 | | | 3.6 |

*All filter cakes were less than 1/32 in. thick except for the saturated fluid treated with the 70:30 copolymer which resulted in a 14/32 in. thick cake.

EXAMPLE 5

An 80:20 acrylamide:potassium acrylate emulsion copolymer, having a relative viscosity of 50 seconds, was added at a 3 ppb. addition level to a drilling fluid prepared with a saturated aqueous solution of magnesium chloride. The treated drilling fluid was aged at 180° F. for 16 hours and then tested for fluid loss. An untreated sample was also evaluated as a control. The control had a fluid loss of 76 cc after 30 minutes with a filter cake thickness of 4/32 in. The sample containing the acrylamide: potassium acrylate copolymer had a fluid loss of only 7.8 cc with a cake thickness of less than 1/32 in.

EXAMPLE 6

This example compares the performance of a 80:20 acrylamide:potassium acrylate emulsion copolymer with other commonly used fluid loss control additives.

Drilling fluids were prepared from a saturated aqueous solution of calcium chloride and treated with 1-3 ppb of the various polymers to be tested. The treated samples were aged at 180° F. for 16 hours then tested for fluid loss. The results may be found in Table VI.

The results show that the acrylamide:acrylate emulsion copolymer provided good fluid loss control to the high calcium-containing fluid. In comparison to the blank, sulfonated polystyrene and sodium polyacrylate were seen to provide no fluid loss control. The polyanionic cellulose provided some decrease in fluid loss which can be attributed to the undesirable gel formation observed which can act to plug the filter paper during evaluation.

EXAMPLE 7

This example compares the fluid loss control provided by an 80:20 acrylamide:acrylate emulsion copolymer with two 80:20 acrylamide:acrylate dry solution copolymers and a hydrolyzed polyacrylonitrile emulsion polymer.

Drilling fluids prepared with either 4% or saturated solutions of calcium chloride were treated with an equivalent of 2 to 3 ppb of the polymers, aged 16 hours at 180° F., then evaluated for fluid loss control. The results may be found in Table VII.

The results show that the hydrolyzed polyacrylonitrile emulsion polymer did not provide fluid loss control in the presence of high concentrations of calcium ions. The fluids containing the acrylamide:acrylate emulsion copolymer had better fluid loss control in comparison to those containing the dry solution copolymers. While the fluid loss results in the saturated CaCl$_2$ systems employing the solution copolymers appeared to be good, the results may be due to the plugging of the filter paper by the undesirable patchy gel observed.

TABLE VI

| Polymer[a] | Rel. Visc. (sec.) | Polymer Treatment Level (ppb) | A.P.I. Fluid Loss Results After 180° F. Aging | |
|---|---|---|---|---|
| | | | cc. After 30 min. | Cake Thickness (1/32 in.) |
| Control (Blank) | — | — | 114 | 4 |
| 80:20 Acrylamide: Potassium Acrylate Copolymer | 49 | 1 | 4 | <1 |
| | | 2 | 3 | <1 |
| | | 3 | 2 | <1 |
| Sulfonated polystyrene | 50 | 1 | 138 | 6 |
| | | 2 | 124 | 6 |
| | | 3 | 120 | 6 |
| Sodium Polyacrylate | 37 | 1 | 118 | 4 |
| | | 2 | 116 | 4 |
| | | 3 | 120 | 4 |
| Polyanionic Cellulose | — | 1 | 300 | 13 |
| | | 2 | 88 | —[b] |
| | | 3 | 24 | —[b] |

[a]All polymers except the acrylamide:acrylate copolymer were employed in dry powder form.
[b]Cake thickness was not measurable due to gel formation.

TABLE VII

| Polymer | Treatment Level (ppb) | CaCl$_2$ Concentration | API Fluid Loss After 180° F. Aging | | |
|---|---|---|---|---|---|
| | | | cc after 30 min. | Cake Thickness 1/32 in. | Cake Appearance |
| Control (Blank) | 0 | 4% | 115 | 5 | — |
| 80:20 Acrylamide:Potassium Acrylate[a] | 2 | 4% | 42 | 2 | smooth, slimy |
| | 3 | 4% | 14 | 1 | smooth, slimy |
| 80:20 Acrylamide Sodium Acrylate[b] | 2 | 4% | 38 | 6 | soft, irregular |
| | 3 | 4% | 27 | 4 | soft, irregular |
| 80:20 Acrylamide:Sodium Acrylate[b] | 2 | 4% | 48 | 6 | soft, irregular |
| | 3 | 4% | 28 | 4 | soft, irregular |
| Hydrolyzed Polyacrylonitrile[c] | 2 | 4% | 142 | 6 | soft, flexible |
| | 3 | 4% | 140 | 6 | soft, flexible |
| Control (Blank) | 0 | Sat'd | 112 | 3 | — |
| 80:20 Acrylamide:Potassium Acrylate[a] | 2 | Sat'd | 2 | <1 | film |
| | 3 | Sat'd | 1 | <1 | film |
| 80:20 Acrylamide:Sodium Acrylate[b] | 2 | Sat'd | 25 | — | patchy gel |
| | 3 | Sat'd | 7.6 | — | patchy gel |
| 80:20 Acrylamide:Sodium Acrylate[b] | 2 | Sat'd | 3.8 | — | patchy gel |
| | 3 | Sat'd | 3.0 | — | patchy gel |
| Hydrolyzed Poly-Acrylonitrile[c] | 2 | Sat'd | 312 | 8 | hard, cracked |
| | 3 | Sat'd | 310 | 8 | hard, cracked |

[a]emulsion copolymer having a relative viscosity of 48 seconds.
[b]dry solution copolymers having relative viscosities of approximately 122 seconds.
[c]Alcomer 508L obtained from Allied Colloids, Inc. (emulsion polymer having a relative viscosity of 115 seconds).

EXAMPLE 8

This example compares the fluid loss control provided by a 70:30 acrylamide:acrylate emulsion copolymer in a 24,000 ppm Ca++ion-containing system with a vinyl sulfonate: vinyl amide solid copolymer known to be tolerant of calcium contamination.

Drilling fluid samples containing 14 g bentonite, 35 g sodium chloride, and 35 g calcium chloride in 350 ml of water were treated with 7 g (equivalent to 7 ppb.) of the copolymers. The samples were aged at room temperature for 16 hours then evaluated for fluid loss. Both copolymers provided smooth, uniform filter cakes of 1/32 in. in thickness and excellent fluid loss control (only 4.8-5.0 cc. after 30 minutes).

EXAMPLE 9

This example illustrates the necessity of having at least a small amount of bridging solids present in the drilling fluid in order for an emulsion acrylamide:acrylate copolymer of the present invention to provide fluid loss control in calcium containing systems.

Low solids drilling fluids were prepared by adding 0-2.00 ppb of either bentonite or calcium carbonate bridging solids to saturated aqueous calcium chloride. The fluids were further treated with 3 ppb of an 80:20 acrylamide:potassium acrylate emulsion copolymer having a relative viscosity of 48 seconds. Treated and untreated samples were aged at room temperature for 16 hours and fluid loss was determined. The results may be found in Table VIII.

TABLE VIII

| Bridging Solid (ppb) | | A.P.I Fluid Loss of Saturated CaCl$_2$ Fluid After Room Temp. Aging | |
|---|---|---|---|
| | | Solids Only | Solids + 3 ppb Copolymer |
| Bentonite | 0 | 340 | 250 |
| | 0.25 | 334 | 30 |
| | 1.00 | 328 | 24 |
| | 2.00 | 336 | 8 |
| Calcium Carbonate | 0 | 342 | 248 |
| | 0.25 | 344 | 6 |
| | 1.00 | 170 | 3 |
| | 2.00 | 326 | 7 |

As can be seen from the data, at least about 0.25 ppb of bridging solids are necessary in a drilling fluid in order for the emulsion copolymer to provide fluid loss control.

EXAMPLE 10

This example illustrates the ability of 80:20 acrylamide:potassium acrylate emulsion copolymers to effectively provide fluid loss control to drilling fluids prepared from a brine which contains high concentrations of divalent cations.

Williston Basin Brine which generally contains between 20,000-90,000 ppm divalent cations and an additional 50,000-90,000 ppm monovalent cations was employed. The divalent cations consist primarily of Ca++ and Mg++ with minor amounts of Zn++ and Fe++. The monovalent cations consist primarily of Na+ with smaller amounts of K+ ions.

Drilling fluids were prepared from a Williston Basin Brine which was mixed with 0-25 ppb. attapulgite clay, 0-116 ppb. barite, 0-22.5 ppb. bentonite and 0-6 ppb. calcium carbonate. The fluids were treated with 0-4 ppb. of emulsion copolymers having relative viscosities of approximately 48 seconds, aged for 16 hours at room temperature or 180° F., then evaluated for fluid loss. The results may be found in Table IX.

As can be seen by the data, the emulsion copolymer was effective in providing fluid loss control to brine-containing fluids.

Summarizing, fluid loss control additives which are useful in divalent cation-contaminated drilling fluids are provided. Drilling fluid formulations with improved fluid loss control are obtained when high molecular weight water-in-oil emulsion copolymers of acrylamide and a water-soluble salt of acrylic acid are employed as fluid loss control agents.

The preferred embodiments of the present invention having been described above, various modifications and improvements thereof will now become readily apparent to those skilled in the art. Accordingly, the spirit and scope of the present invention is defined not by the foregoing disclosure, but only by the appended claims.

TABLE IX

| Sample | Solids in Williston Brine (ppb) | | | | Treatment Level of Copolymer (ppb) | Aging Temperature | API Fluid Loss Results cc. after 30 min. |
| --- | --- | --- | --- | --- | --- | --- | --- |
| | Attapulgite Clay | barite | bentonite | CaCO₃ | | | |
| A | — | — | — | 2 | 0 | RT | 340 |
| B | — | — | — | 2 | 4 | RT | 31 |
| C | — | — | — | 4 | 4 | RT | 21 |
| D | — | — | — | 6 | 4 | RT | 8 |
| E | — | — | 22.5 | — | 0 | 180° F. | 205 |
| F | — | — | 22.5 | — | 2 | 180° F. | 9 |
| G | — | — | 22.5 | — | 3 | 180° F. | 4 |
| H | 25 | 116 | — | 2 | 0 | 180° F. | 100 |
| I | 25 | 116 | — | 2 | 2 | 180° F. | 13 |
| J | 20 | 116 | 5 | — | 0 | 180° F. | 115 |
| K | 20 | 116 | 5 | — | 2 | 180° F. | 24 |
| L | 20 | 116 | 5 | — | 3 | 180° F. | 14 |

We claim:

1. A drilling fluid comprising:
   a. an aqueous solution containing at least 10,000 parts per million of a divalent metal cation;
   b. a water-in-oil emulsion copolymer of monomers consisting of acrylamide and a water-soluble salt of acrylic acid wherein the acrylamide and acrylic acid are present in a molar ratio of about 70:30 to 95:5, the copolymer having a molecular weight of at least one million; and
   c. at least about 0.25 pounds per barrel of a particulate bridging solid capable of forming a filter cake against an exposed permeable formation;
   wherein b and c are present in amounts sufficient to reduce fluid loss during drilling.

2. The drilling fluid of claim 1, wherein at least 0.5 pounds of the emulsion copolymer are used per barrel of aqueous solution.

3. The drilling fluid of claim 2, wherein the bridging solid is selected from the group consisting of bentonite and calcium carbonate.

4. The drilling fluid of claim 2, wherein the divalent cation is present in amounts of about 10,900 to 134,800 parts per million and is selected from the group consisting of calcium, magnesium and mixtures thereof.

5. The drilling fluid of claim 4, wherein the emulsion copolymer is present in an amount up to 8.0 pounds per barrel.

6. The drilling fluid of claim 4, wherein the acrylic acid salt is sodium or potassium.

7. The drilling fluid of claim 6, wherein the emulsion copolymer has a 0.1% solids aqueous solution relative viscosity of at least 37 seconds.

8. The drilling fluid of claim 7, wherein the copolymer has a molar ratio of acrylamide to acrylic acid of 70:30 to 90:10.

9. The drilling fluid of claim 8, wherein the emulsion copolymer has a viscosity of from about 40 to 60 seconds.

10. The drilling fluid of claim 8, wherein the emulsion copolymer has a molar ratio of about 80:20 and is present in an amount of 1.0 to 4.0 pounds per barrel.

11. A process for drilling a subterranean formation well comprising circulating into the well, during drilling a fluid comprising:
   a. an aqueous solution containing at least 10,000 parts per million of a divalent metal cation;
   b. water-in-oil emulsion copolymer of monomers consisting of acrylamide and a water-soluble salt of arcylic acid wherein the acrylamide and acrylic acid are present in a molar ratio of about 70:30 to 95:5, the copolymer having a molecular weight of at least one million; and
   c. at least about 0.25 pounds per barrel of a particulate bridging solid capable of forming a filter cake against the exposed permeable formation; wherein b and c are present in amounts sufficient to reduce fluid loss during drilling.

12. The process of claim 11, wherein at least 0.5 pounds of the emulsion copolymer are used per barrel of aqueous solution.

13. The process of claim 12, wherein the bridging solid is selected from the group consisting of bentonite and calcium carbonate.

14. The process of claim 12, wherein the divalent cation is present in amounts of about 10,900 to 134,800 parts per million and is selected from the group consisting of calcium, magnesium, and mixtures thereof.

15. The process of claim 14, wherein the emulsion copolymer is present in an amount up to 8.0 pounds per barrel.

16. The process of claim 14, wherein the acrylic acid salt is sodium or potassium.

17. The process of claim 16, wherein the emulsion copolymer has a 0.1% solids aqueous solution relative viscosity of at least 37 seconds.

18. The process of claim 17, wherein the copolymer has a molar ratio of acrylamide to acrylic acid of 70:30 to 90:10.

19. The process of claim 18, wherein the emulsion copolymer has a viscosity of from about 40 to 60 seconds.

20. The process of claim 18, wherein the emulsion copolymer has a molar ratio of about 80:20 and is present in an amount of 1.0 to 4.0 pounds per barrel.

* * * * *